April 24, 1951     V. H. KRAYBILL     2,549,976
FLICKER VOLTAGE AND CURRENT MEASURING AND
RECORDING APPARATUS Filed Jan. 11, 1946     5 Sheets-Sheet 1

Fig. 1

INVENTOR.
Victor H. Kraybill,
BY

Patented Apr. 24, 1951

2,549,976

UNITED STATES PATENT OFFICE 2,549,976

FLICKER VOLTAGE AND CURRENT MEASURING AND RECORDING APPARATUS

Victor H. Kraybill, Hollywood, Ill.

Application January 11, 1946, Serial No. 640,600

8 Claims. (Cl. 346—33)

1

The present invention relates to flicker voltage and current measuring apparatus. The measurement of rapid changes in voltage, commonly known as flicker voltage, usually caused by welding apparatus, pumps and other reciprocating apparatus, etc., presents problems not encountered in ordinary electrical measurements. Conventional types of indicating and recording meters now in use show RMS values (i. e., root-mean-square or effective values) but respond too slowly. Conventional oscillographs record instantaneous values and consequently have ample speed of response, but it is extremely difficult to obtain root-mean-square values from an oscillogram of the voltage when there is a variation in the wave form. Most electric welding machines cause appreciable variations in the supply voltage wave form.

To measure these flicker voltages, it is necessary to have a device which is very rapid in response and which will also record RMS values. I have accomplished this by devising improved apparatus comprising a lamp bulb connected to the voltage to be measured, a phototube which allows a unidirectional current to flow in proportion to the quantity of light striking it, and a direct current vacuum tube amplifier. The light output of the lamp varies with the applied voltage and is measured by the phototube. The output of the phototube is then amplified by means of the direct current vacuum tube amplifier. The output of the amplifier is used to operate an oscillograph, so as to provide an oscillographic record of the variations in light output of the lamp bulb. This record constitutes a record of the RMS values of the flicker voltages. A calibration is made so that the oscillograph record can be read directly in terms of volts.

The advantages of this improved apparatus are: (1) it is practically unaffected by wave form; (2) it has a high speed of response; and (3) it possesses the ability to measure flickers which are even too small to be noticeable to the eye.

My improved apparatus is also readily adaptable to the measurements of electric currents of non-sine wave form as well as voltages.

Other features, objects and advantages of the invention will be apparent from the following detailed description of one preferred embodiment thereof. In the accompanying drawings illustrating such embodiment.

Figure 1:
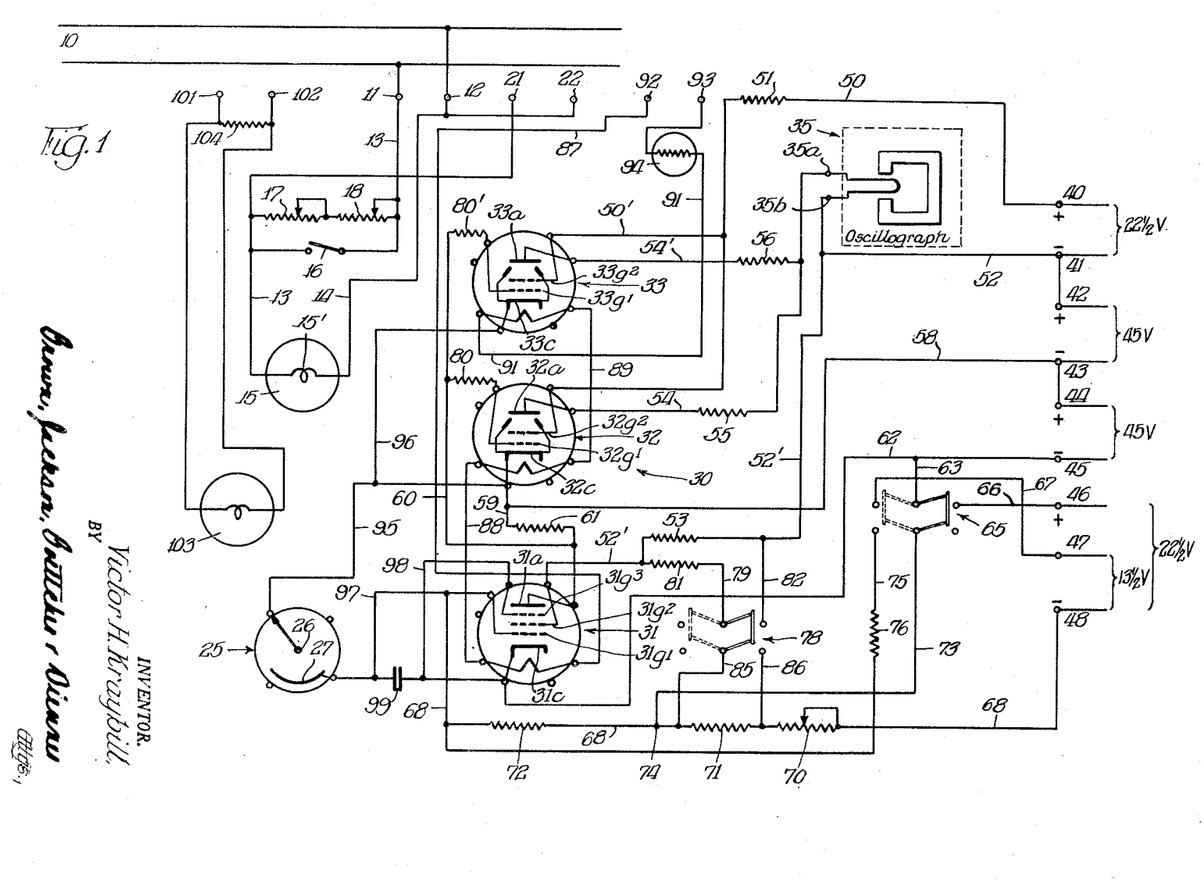
Figure 1 is a circuit diagram of my improved apparatus.

Referring to Figure 1, the alternating current line which is to have its flicker voltage measured is indicated at 10. My improved apparatus has two main input terminals 11 and 12 which are adapted to be connected across this alternating current line. These input terminals are connected through conductors 13 and 14 with a light emitting filament 15' preferably embodied in a conventional lamp bulb 15. To provide for calibrating the apparatus, a switch 16 is interposed in series in one of the conductors 13 or 14, and one or more variable resistors 17 and 18 are connected in shunt across this switch. By opening the switch 16, the variable resistors 17 and 18 can be adjusted to calibrate the apparatus by varying the intensity of illumination of the bulb 15. The voltage established by this calibrating adjustment can be read by connecting an indicating voltmeter to terminals 21 and 22, which are connected to circuit 13, 14 in such manner as to receive the adjusted voltages established by the variable resistances 17, 18.

The light emitted by lamp bulb 15 is projected to a light responsive element such as a conventional phototube 25. This phototube or photoelectric cell comprises the usual anode 26 and cathode 27, the latter comprising the photoelectric surface which emits electrons under the action of the light rays received from the lamp bulb 15.

The output of the phototube 25 is preferably amplified by an amplifying unit indicated in its entirety at 30, and the output of this amplifying unit is then utilized to operate an oscillograph indicated in its entirety at 35. The amplifying unit 30 is preferably a vacuum tube amplifier of the direct current type, whereby it does not impress any alternations or pulsations on the input signal which might disturb the accuracy of the flicker voltage record. The amplifier is shown as comprising three vacuum tubes 31, 32, and 33, although it will be understood that the number of tubes or stages of amplification can be varied as desired. The tube 31 is preferably a voltage and current amplifying tube, typically represented by a 6J7 triple grid detector amplifier. The other two tubes 32 and 33 are preferably current amplifying tubes, typically represented by 25L6 beam power amplifying tubes. The two latter tubes are shown as having their plate and grid circuits connected in parallel. However, there is no specific limitation to any type or types of tubes 31, 32, and 33, nor to any particular circuit, because numerous amplifying tubes and different circuits having the desired characteristics can be employed.

The oscillograph 35 is preferably a magnetic type of oscillograph, typically represented by a "Type PA Universal Oscillograph" manufactured by Westinghouse Electric & Manufacturing Company. A magnetic type of oscillograph is preferred because of its high speed, permanent form of record, etc., but it will be understood that other oscillographs and other responsive units can be employed, if preferred.

Figure 1A:
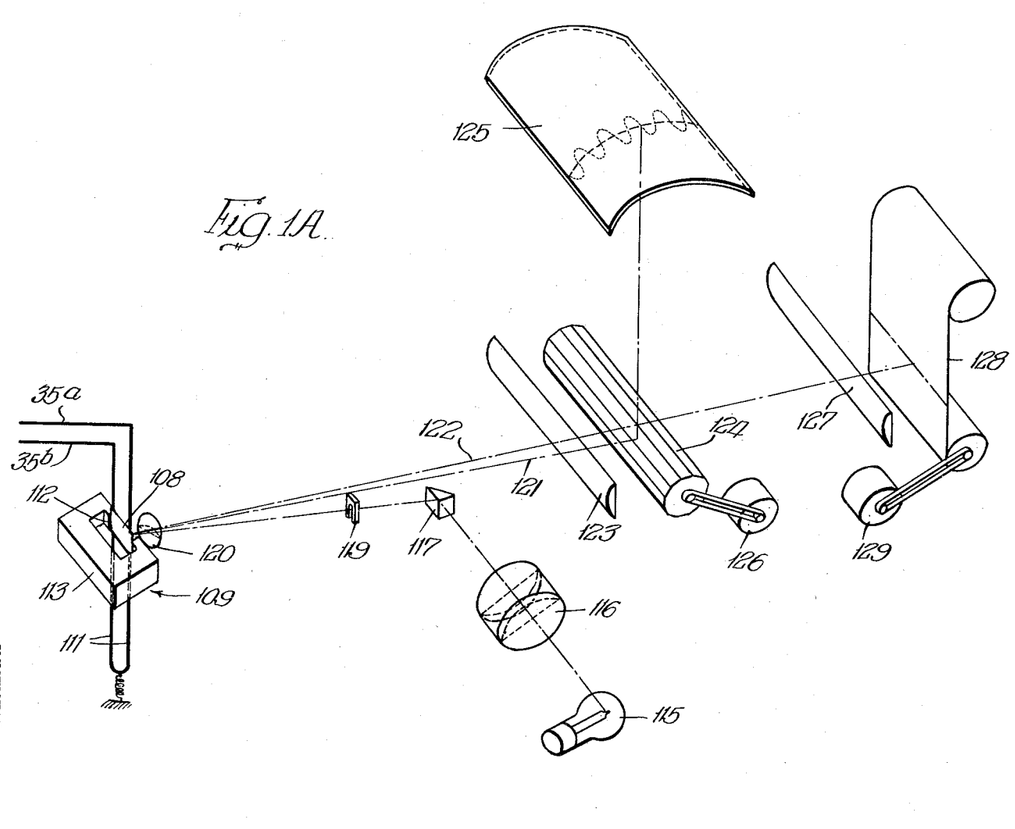
Figure 1A is a schematic diagram of the electro-magnetic oscillograph which responds to the circuit of Figure 1 and produces the photographic charts that permanently record the flicker voltage.

This electro-magnetic type of oscillograph is schematically illustrated in Figure 1A, and will be described later.

The plate current supply and the grid bias voltages for the amplifying tubes may be obtained from any suitable direct current source, such as self-contained batteries, a voltage divider, a rectifier, or a suitable power pack. At the right hand edge of Figure 1 I have illustrated pairs of terminals 40—41, 42—43, 44—45, 46—47—48 corresponding to battery terminals of different potentials, such as 22½ volts, 45 volts, etc. These voltages are, of course, appropriate to the particular requirements of the amplifying tubes 31, 32, and 33. If an external source of direct current from a lighting circuit or other circuit is available, such as approximately 112.5 volts D. C., then a voltage divider may be employed for supplying the several voltages to the terminals 40 to 48 inclusive. Terminal 40 is connected through conductors 50 and 50' with the screen grids $32g2$ and $33g2$ of the tubes 32 and 33, an appropriate resistor 51 being interposed in conductor 50 if necessary. Supply terminal 41 is connected by conductor 52 with one of the input terminals $35b$ of the oscillograph 35, and is also connected by way of conductor 52' and resistor 53 with the screen grid $31g2$ of tube 31. The other input terminal $35a$ of the oscillograph is connected by conductors 54 and 54' with the anodes $32a$ and $33a$ of the tubes 32 and 33, appropriate resistors 55 and 56 being interposed in these anode circuits if desired. Battery supply terminal 42 is connected to adjacent terminal 41. Terminals 43 and 44 are connected together and have connection through conductor 58 with plate circuit conductor 59 leading from the anode $31a$ of tube 31 to the cathode $32c$ of tube 32. An appropriate resistor 61 is interposed in conductor 59. Terminal 45 is connected through conductor 62 with the cathode $31c$ of tube 31. Conductor 62 is also connected through conductor 63 with the upper central terminal of a doublepole, double-throw switch 65 which is provided for adjusting the output of the amplifier so as to obtain the proper throw or deflection of the oscillograph 35. Supply terminal 46 is connected through conductor 66 with the upper right hand terminal of the switch 65, and supply terminal 47 is connected through conductor 67 with the upper left hand terminal of the switch 65. Supply terminal 48 is connected through conductor 68 with the control grid $31g1$ of tube 31. Resistors 70, 71 and 72 are interposed in conductor 68, the resistor 70 preferably being a variable resistor. The lower central terminal of the double-throw switch 65 is connected through conductor 73 with a tap 74 in conductor 68 at a point between resistors 71 and 72. The lower left hand terminal of the double-throw switch 65 is connected through conductor 75 and resistor 76 with the conductor 68 at a point between resistor 72 and control grid $31g1$, whereby when the switch 65 is thrown to the left hand position the resistor 76 is placed in shunt across resistor 72.

For effecting a still further shift of the deflection range of the oscillograph 35, another double-pole switch 78 is connected substantially as shown. The upper central terminal of this latter switch has connection through conductor 79 with one end of a resistor 81 which has its other end connected to conductor 52' at a point between resistor 53 and screen grid $31g2$. The upper right hand terminal of the double-throw switch 78 is connected through conductor 82 with conductor 52' at the right hand side of resistor 53. The two lower terminals of switch 78 are connected directly across resistor 71 through conductors 85 and 86. When the switch 78 is in the open position resistor 53 is in series in conductor 52' and resistor 81 is disconnected, and when the switch is swung to its closed position resistor 81 is connected in parallel across resistor 53. Also with reference to resistor 71, when the switch 78 is in its open position this resistor is effective in conductor 68, and when the switch is in its closed position this resistor is shunted by the switch.

The cathodes of the three tubes are preferably of the heater type, having filaments which may be heated from any suitable source of electrical energy, in the exemplary arrangement shown these three filaments being connected together in series through conductors 87, 88, 89 and 91, this series circuit extending from input terminals 92 and 93 which may be energized by a conventional lighting circuit potential of approximately 110 or 115 volts alternating current. Any appropriate resistor or current controlling device 94, such as a ballast tube, may be interposed in this series circuit for controlling the filament supply.

The anode 26 of the photoelectric cell 25 has parallel connection with the cathodes $32c$ and $33c$ of the tubes 32 and 33 through conductors 95 and 96. The cathode 27 of the photoelectric cell is connected through conductor 97 with the control grid $31g1$ of tube 31. While I refer to a "photoelectric cell," it is to be understood that any suitable light sensitive device can be used. Suppressor grid $31g3$ of tube 31 is connected by way of conductor 98 with the cathode $31c$ of this tube. A condenser 99 is connected between conductors 97 and 98, this condenser serving to partially filter out 120 cycle component in the light output of the lamp bulb 15, this 120 cycle component corresponding to the 120 alternations of a 60 cycle source. A tuned filtering network can also be used in place of the simple condenser 99.

I also contemplate employing my improved measuring apparatus to measure electric currents of non-sine wave form. For this purpose, an additional pair of input terminals 101 and 102 are connected with a lamp bulb 103. A shunt 104 or a current transformer would be connected between terminals 101, 102 and the lamp 103. The action in the phototube 25, amplifying tubes 31, 32, and 33 and oscillograph circuits would be the same for measuring varying currents as for measuring flicker voltages.

When switches 65 and 78 are in the right hand positions, which gives the greatest sensitivity, the bias circuit for tube 31 is from its cathode 31C through conductors 62 and 63, through switch 65 and conductor 66 to the positive terminal 46 of a 22½ volt battery. The circuit continues through the battery and the negative terminal 48 through conductor 68 and the resistors 70 and 72 (switch 78 shorting resistor 71) to the control grid 31g1. To trace the circuit for the phototube 25 we can best start at the negative terminal 48 and follow along lead 68 and resistors 70 and 72 then lead 97 through phototube 25 and along leads 95 and 58 to the positive terminal 44. The circuit then continues through the 45 volt battery and the negative terminal 45, through conductors 62 and 63, switch 65, and lead 66 to the positive terminal 46, and then through the 22½ volt battery to the negative terminal 48 from which we started. It is thus apparent that the resistors 70 and 72 are common to both the grid circuit of the amplifying tube 31 and the circuit for the phototube 25.

If the cathode 27 of the phototube 25 is not illuminated, the tube will not pass current and there will not be any current flow through resistors 70 and 72 and therefore no voltage drop across them. The grid 31g1 would then be biased at 22½ volts negative with respect to cathode 31C. However, if we energize the leads 10, the cathode 27 of the phototube 25 will be illuminated from the lamp 15 and current will flow through the previously described phototube circuit. This current will produce a voltage drop across resistors 70 and 72 which will oppose the 22½ volts negative applied to the grid 31g1. Thus there are two opposing voltages acting upon the grid 31g1. One of these voltages is constant and tends to make the grid 22½ volts negative with respect to the cathode 31C. The other voltage, produced by the phototube 25 current through the resistors 70 and 72, is slightly smaller, so that the resultant voltage between the control grid 31g1 and the cathode 31C is approximately 1 volt.

Thus the resultant control grid bias voltage is a small quantity which is obtained by taking the difference between two larger quantities one of which is variable and the other being fixed. Therefore small variations in the voltage applied to the leads 10 can be made to deflect the oscillograph from a zero deflection to a full scale deflection.

Referring now to the schematic diagram of the electro-magnetic oscillograph 35, shown in Figure 1A, it will be seen that this type of oscillograph traces its visual photographic graph with a light beam which is deflected by the mirror 108 of a galvanometer 109. This mirror is carried by a moving coil 111 consisting of a single loop or pair of conductors arranged so that the direct current impressed upon the oscillograph terminals 35a and 35b passes down one conductor of the moving coil and up the other conductor. This moving coil is mounted for limited rotative movement in a magnetic field defined in the air gap 112 of a permanent magnet 113 or like electromagnetic structure. The light rays originate from any suitable light source 115 which projects rays through a compound corrected lens 116 and thence to an adjustable prism 117. The light rays reflected from this prism pass through an adjustable slit 119 and through a plano-convex lens window 120 and thence fall upon the galvanometer mirror 108. Reflected from this mirror is a narrow slit image or beam which, for simplicity, will be referred to as a lower light beam 121 and an upper light beam 122. The lower light beam 121 passes through a cylindrical lens 123, and is thence reflected from a synchronizing polygon of mirrors 124 to a ground glass screen 125 for viewing. The synchronizing polygon of mirrors is driven by any suitable electric motor 126. The upper light beam 122 passes through a cylindrical condensing lens 127 and thence falls upon a traveling photographic film 128. Such traveling film is actuated by any suitable arrangement of reels driven by an electric motor 129. This traveling film 128 makes the permanent photographic record which is illustrated in the oscillogram charts or graphs shown in Figures 3, 4 and 5 of the drawings. As previously remarked, the above described oscillograph 35 is typically exemplified by the Westinghouse Electric and Manufacturing Co. "Type PA Universal Oscillograph." The instrument may be provided with multiple light paths for multiple light beam tracing, but, for reasons of simplicity, I have only shown one of these light beam paths.

I shall now briefly describe the operation of the circuit, and shall then refer to the oscillograms of Figures 2, 3, 4 and 5 for showing the distinctive results obtained by the apparatus. It will be assumed that the line 10 has an objectionable flicker voltage which it is desired to measure, and hence this line is connected to the input terminals 11 and 12. A source of filament current supply is also connected to terminals 92 and 93, this filament supply circuit usually being the same circuit as the one being measured. The intensity of illumination of the filament 15' of the lamp bulb 15 will vary with voltage changes impressed on the lamp bulb, and hence the quantity of light transmitted from this lamp bulb to the phototube 25 will vary with flickering changes in the potential impressed upon the lamp bulb. Since the temperature and consequently the light output of the bulb 15 varies with each alternation (two per cycle) of the impressed voltage, a 120 cycle component appears in the output of the device when measuring a 60 cycle line, as will appear more fully in connection with the oscillograms of Figures 2, 3, 4 and 5. Variations of light emission from the lamp bulb 15 do not occur instantaneously with variations of voltage impressed on the bulb because of the heat storage characteristic of the filament 15'. This heat storage characteristic of the filament is advantageously utilized to obtain correct registration when the voltage wave form is distorted. Since the light output of an incandescent lamp is a function of the heat supplied to the filament, and the heating effect of an electric current is proportional to the square of the RMS value, it follows that if a sine wave of a certain RMS value produces one unit of light, a non-sine wave of the same RMS value will produce the same unit of light, and therefore the output of the device will be a function of the RMS voltage rather than the average or the peak voltage. Thus, the light emitted from the bulb 15 impinging upon the phototube 25, causes a current to flow through the phototube circuit which is a function of the RMS voltage effective on the line 10. When no current flows through the phototube circuit, the control grid 31g1 is biased negatively beyond the cut-off value of the tube. In the illustrated arrangement, this bias is shown as being 22.5 or 13.5 volts negative, depending upon the position of the double-pole, double-throw switch 65. Placing this switch in one position or the other adjusts the apparatus to keep the flicker voltage record within the scale range of the oscillograph, as will be later described.

When current flows through the phototube 25 such current passes through resistors 70 and 72 (and possibly also through resistors 71 and 76 depending upon the positions of the switches 65 and 78). This phototube current flow produces a voltage drop across these resistors, which voltage drop is in opposition to the negative bias voltage on the control grid 31g1 of tube 31 and hence reduces this negative bias. Therefore, with increased light on the phototube 25 the grid will be biased to a smaller negative voltage. As this negative bias voltage decreases, the current in the plate circuit of tube 31 increases. This plate circuit extends from terminal 45 through cathode 31c, anode 31a and the resistor 61 back to terminal 44. As this plate current flow increases, the increased voltage drop across resistor 61 causes the control grids 32g1 and 33g1 of tubes 32 and 33 to be biased more negatively, thereby decreasing the plate current flow in these tubes. The circuit for these control grids 32g1 and 33g1 comprises conductor 60 which has connection with anode 31a or with conductor 59 on the anode side of resistor 61, this conductor 60 having parallel connection through appropriate resistors 80, 80' with the control grids 32g1 and 33g1 of tubes 32 and 33. When there is no plate current flow in the tube 31 the other two tubes, 32, and 33 in parallel have substantially zero bias on their control grids. The circuit for the plate current flow to tubes 32 and 33 is through two parallel paths, the path for tube 32 starting at terminal 43 and extending over conductor 58 through cathode 32c, anode 32a, conductor 54, resistor 55, and terminal 35a of the oscillograph 35. The other path through tube 33 extends from conductor 58 through conductors 95 and 96, cathode 33c, anode 33a, conductor 54' and resistor 56 up to the terminal 35a of oscillograph 35. Here the two currents combine and pass through the oscillograph 35, and thence out through terminal 35b and conductor 52 back to terminal 42. An increase in this plate current flow through tubes 32 and 33 causes an increased deflection of the oscillograph 35. The apparatus is so adjusted that the output or plate current of the tubes 32 and 33 is almost zero when the varying voltage on the line to be measured is at its highest level. When this voltage being measured decreases in value, the output of the lamp bulb 15 and the current output of the phototube 25 decrease in value, causing the control grid 31g1 of the tube 31 to become more negative, thereby decreasing its plate current. This causes the control grids 32g1 and 33g1 of the tubes 32 and 33 to become less negative, thereby increasing the output current of the device, i. e., the plate current through the tubes 32 and 33 to the oscillograph. This increased current flow to the oscillograph causes its light beam to be deflected in a "downward" direction, i. e., in a direction to indicate a decrease in the RMS voltage effective on line 10.

Referring now to the adjustments of the apparatus, and particularly the adjustments for the purpose of assuring that the flicker voltage deflections on the oscillograph will not exceed or run off either side of the full scale reading of the oscillograph, as soon as the power line 10 has been connected to terminals 11 and 12 and the tubes and oscillograph are in operative condition, the switch 16 in the circuit of the lamp bulb 15 is closed and the variable resistor 70 is adjusted so that a small deflection is obtained on the oscillograph with maximum normal voltage applied to the terminals 11 and 12. When this voltage decreases, as for example due to increased power demand caused by an electric welder, air compressor, etc., the previously explained action in the lamp bulb 15, phototube 25, and amplifier unit 30 causes an increased deflection of the oscillograph 35. The amount of this deflection for a given decrease in the voltage applied to terminals 11 and 12 is determined by the position of switches 65 and 78. With switches 65 and 78 in their right hand closed positions, the greatest deflection of the oscillograph is obtained for a given change in voltage, i. e., with the values and types of tubes shown a voltage drop of substantially 4 volts will produce approximately full scale deflection. If the flicker (change in voltage) is so large as to produce more than a full scale reading on the oscillograph 35, then switch 78 is shifted to its open or left hand position. When this switch 78 was in its right hand or closed position, resistors 81 and 53 were in parallel, but with this switch in the left hand or open position resistor 81 is cut out of circuit, leaving only resistance 53 in the circuit, thereby increasing the resistance in the circuit of screen grid 31g2 of tube 31. The result of this is to increase the amount of voltage change required on the control grid 31g1 of tube 31 to produce a certain change in its plate current, and consequently in the deflection of the oscillograph. With the values shown and described, this position of switch 78 will result in a voltage drop of approximately 8 volts producing substantially full scale deflection. If the flicker is sufficiently large so that the oscillograph still goes off scale, the other switch 65 is then swung over to its left hand position, with the result that a still greater change in voltage across input terminals 11 and 12 is necessary to produce full scale deflection on the oscillograph. This will be understood from the previous explanation that the current flow from the phototube 25 passes through resistors 72 and 70, producing a voltage drop across these resistors and thereby reducing the high negative bias on control grid 31g1 and allowing the tube 31 to conduct current. When switch 65 is swung to the left hand position, a lower bias voltage is applied from terminal 47 instead of terminal 46, and resistor 76 is also placed in parallel across resistor 72. By virtue of this change of position of switch 65 to its left hand position, a greater change in phototube current, and therefore a greater change in voltage applied to input terminals 11 and 12, is required in order to produce a given voltage change on the control grid 31g1, and consequently on the oscillograph registration. Therefore, a larger flicker voltage change will be required to produce full scale reading on the oscillograph. With the values and arrangement disclosed, this left hand position of switch 65 will result in a voltage drop of approximately 16 volts being required to produce full scale deflection.

Whenever it is desired to calibrate the apparatus, switch 16 in the circuit of lamp bulb 15 is moved to open position and resistors 17 and 18 are adjusted so as to reduce the voltage on the lamp bulb 15 to the desired amount. This voltage can be read by connecting an indicating voltmeter to the instrument terminals 21 and 22. This can be done for several different values of voltage and the oscillograph reading noted each time, whereupon a calibration curve can be drawn showing oscillograph readings plotted against volts.

As previously pointed out, condenser 99 is used to partially filter out 120 cycle voltage impressed upon the control grid 31g1 because of the 120 cycle component in the light output of the lamp 15 (i. e., two alternations per cycle of the voltage impressed upon terminals 11 and 12).

Figure 2:
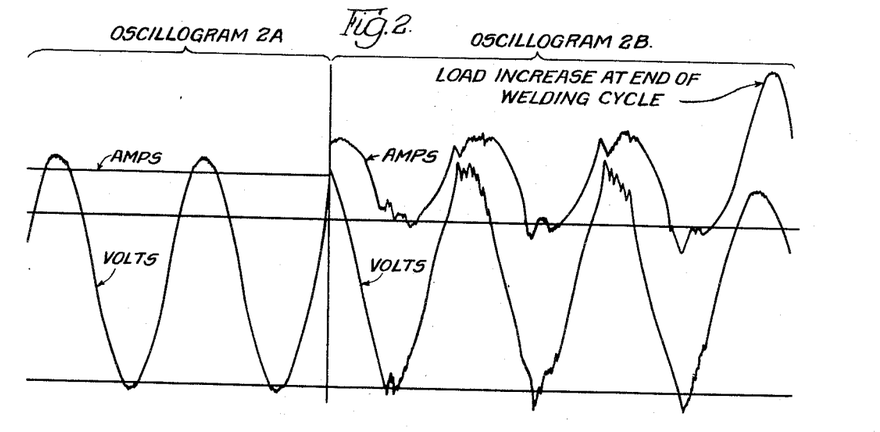
Figure 2 is an oscillogram chart which illustrates the difficulties heretofore encountered when attempting to obtain RMS values from an ordinary oscillograph.

Referring now to the oscillogram chart of Figure 2, the two oscillograms 2A and 2B of this chart illustrate the difficulties heretofore encountered when attempting to obtain RMS values from the conventional operation of an ordinary oscillograph. The oscillogram 2A to the left of Figure 2 shows the normal voltage and current on a supply line leading to a certain welding device adapted to weld barrels, this left hand oscillogram illustrating conditions when the welding device is turned off. The right hand oscillogram 2B shows the voltage and current on the line when the welding device is operating, both oscillograms showing the voltage to the same scale. This particular welding operation was of long enough duration to read the voltage drop on an indicating voltmeter. It will be noted that the vertical peak-to-peak voltage distance is greater on oscillogram 2B than on oscillogram 2A, which would give the impression that there was a voltage rise when the welder was turned on. However, the indicating voltmeter showed an actual voltage drop of approximately 6% when the welder was turned on, contrary to the indications of oscillogram 2B. The erroneous indications of oscillogram 2B arise from the change in wave form. However, even when making a conventional oscillogram on an ordinary oscillograph under conditions where there is no change in wave form, it is not possible to read the ordinary oscillogram to the necessary degree of accuracy.

Figure 3:
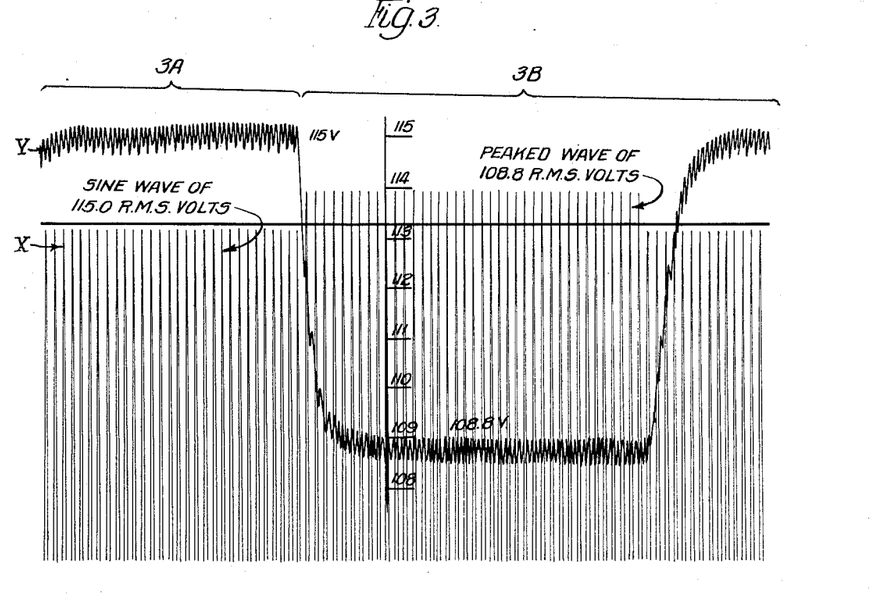
Figure 3 is an oscillogram chart showing a record obtained by means of my improved apparatus operating under conditions similar to those illustrated in Figure 2.

Referring now to the oscillogram chart of Figure 3, this shows a laboratory test illustrating conditions similar to oscillograms 2A and 2B, but also including a record made by my improved flicker voltage measuring apparatus. The conventional oscillogram record is indicated at X, and the record produced by my improved flicker voltage measuring apparatus is indicated at Y. The left hand part 3A of this oscillogram shows a sine wave of 115.0 RMS volts, and the right hand part 3B shows a peaked wave of 108.8 RMS volts, but with a higher peak value than the 115.0 volt sine wave. The true voltage drop is established by the record made by my flicker voltage measuring apparatus, such record being the narrow amplitude wave or trace Y of sawtooth profile. It will be noted that in the transition from 3A to 3B the flicker voltage record Y shows the true voltage drop from 115 volts to 108.8 volts, whereas the conventional oscillogram record X of instantaneous values would indicate a voltage rise. It will be observed that this record Y established by the flicker voltage measuring device has a very sharp saw tooth profile by reason of the 120 cycle component or frequency with which this record is traced, such 120 cycle frequency arising because the light output of the lamp bulb 15 varies with each alternation of the impressed voltage, and hence there are two variations of light for each cycle of the 60 cycle current.

Figure 4:
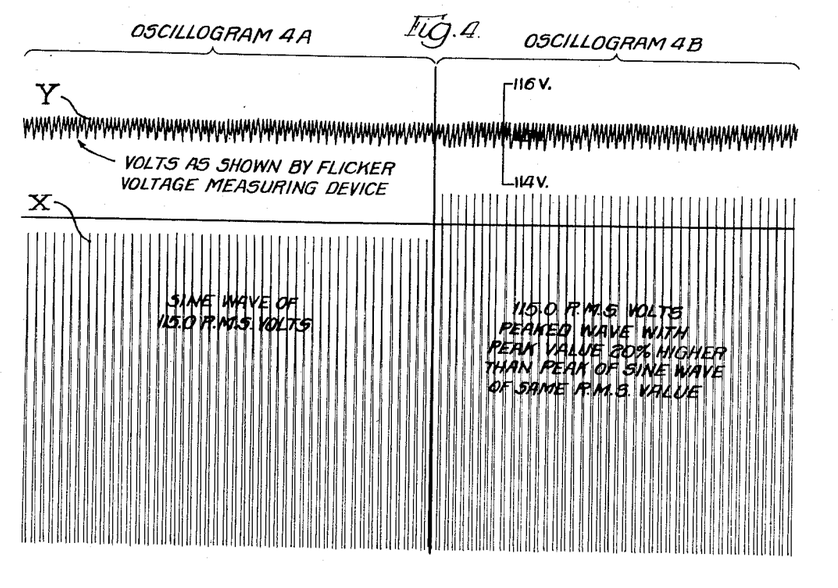
Figure 4 is an oscillogram chart showing that the accuracy of the flicker voltage record is not affected by wave form.

Figure 4 illustrates that the record made by my improved flicker voltage measuring apparatus is not erroneously influenced by a change from a sine wave to a considerably higher peaked wave where the RMS voltage value remains the same. For example, oscillogram 4A shows the conventional record X and the flicker voltage record Y produced by a sine wave of 115.0 RMS volts, whereas oscillogram 4B shows the same records X and Y with a 115.0 RMS peaked wave having a peak value approximately 20% higher than the peak of the sine wave of the same RMS value in oscillogram 4A. It will be noted that this higher peaked value has not erroneously influenced the flicker voltage record Y, this record being increased slightly in amplitude but retaining its mean value at substantially the same voltage level as in oscillogram 4A.

Figure 5:
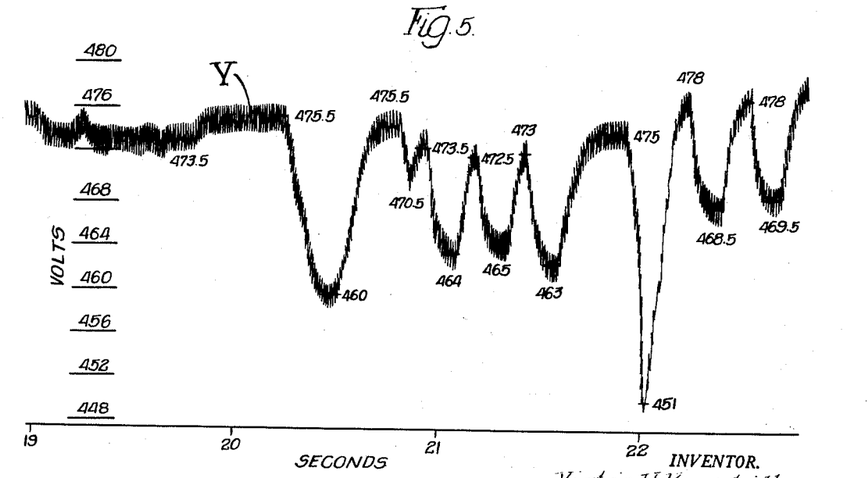
Figure 5 is a typical oscillogram produced by my improved apparatus.

Figure 5 illustrates a typical flicker voltage record Y produced by my improved apparatus, separate and apart from any conventional record X produced by ordinary oscillograph operation. In Figure 5 the voltage scale is based on a normal line voltage of 460 volts.

Figure 6:
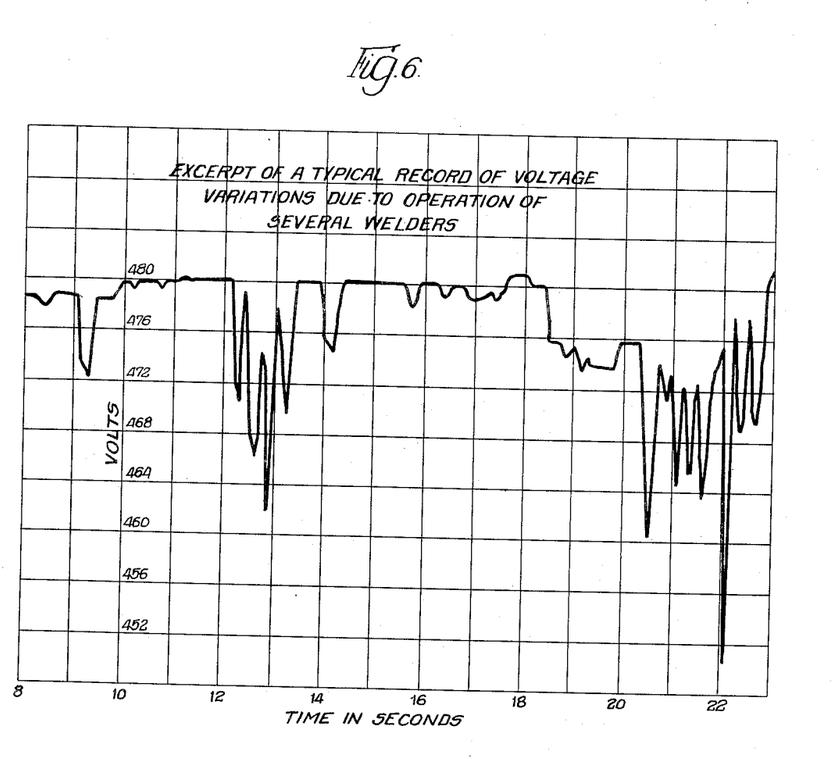
Figure 6 is a time-shortened graph made from one of these flicker voltage oscillograms.

The relatively narrow amplitude or profile depth of the flicker voltage record Y and the relatively wide swing in this trace caused by a relatively small change in voltage, makes the record easy to read and affords a readily understood visual presentation of what flicker voltage means on a line. By way of illustration, the record Y in Figure 5 has a vertical profile dimension averaging less than three volts in depth, whereas the swings of this record extend over a span of about 20 volts. This relationship of a relatively narrow vertical depth or thickness and a relatively wide swing is a result of several factors, such as the heat storage lag of the filament 15', the 120 cycle frequency of the light emanating from this filament, and the fact that the amplifying tubes are so operated that only the critical voltages come within the substantially straight line portions of the amplifying curves of these tubes. The above features of a narrow vertical thickness and a relatively wide swing make the record easy to read and measure when making a time shortened graph. Figure 6 illustrates such a time shortened graph made manually from a typical flicker voltage oscillogram Y such as is illustrated in Figure 5.

The response rate of my improved apparatus is quite high notwithstanding the heat storage lag of the filament 15'. Tests under conditions of instantaneous voltage change show that my improved apparatus will respond quickly enough to show approximately 90% of this instantaneous voltage change within 4 or 5 cycles of the 60 cycle frequency impressed on the line (i. e., within 8 or 10 cycles of the 120 cycle frequency acting on the phototube 25.)

In flicker voltage measuring apparatus which I have operated satisfactorily I have employed adjustable resistances, resistors and capacities of approximately the following values in the circuit of Figure 1:

Adjustable resistance 17=0 to 25 ohms
Adjustable resistance 18=0 to 250 ohms
Resistor 51=100 ohms
Resistor 53=1.15 megohms
Resistor 55=25 ohms
Resistor 56=25 ohms
Resistor 61=50,000 ohms
Adjustable resistance 70=0 to .7 megohm
Resistor 71=75,000 ohms
Resistor 72=1.2 megohms
Resistor 76=1.0 megohm
Resistor 80=.12 megohm
Resistor 80'=.14 megohm
Resistor 81=.16 megohm
Capacity 99=.02 microfarad However, it will be understood that the above values are merely illustrative and that the invention is not limited thereto.

While I have illustrated and described what I regard to be the preferred embodiment of my invention nevertheless it will be understood that such is merely exemplary and that numerous modifications and rearrangements may be made therein without departing from the essence of the invention.

I claim:

1. In flicker voltage measuring apparatus, the combination of a filament adapted to be connected to the circuit to be measured, a light sensitive element responsive to variations in the light emission from said filament, amplifying means comprising a plurality of grid controlled tubes for amplifying the change of output of said light sensitive unit when flicker voltage occurs on said circuit, adjusting means for adjusting the grid bias on one of said tubes, and an oscillograph responsive to said amplifying means.

2. In flicker voltage measuring apparatus, the combination of an incandescent lamp adapted to be connected to the circuit to be measured, a photoelectric cell adapted to respond to variations in the light emitted by said incandescent lamp, a pentode tube responsive to the difference of output of said photoelectric cell between normal voltage and abnormal voltage on said circuit, a pair of tetrode tubes receiving the difference of output of said pentode tube, a direct current source for supplying the anode circuits and the grid bias voltages of said tubes, means for adjusting the grid bias voltage on said pentode tube, and an oscillograph responsive to the output of said tetrode tubes.

3. In apparatus for measuring the flicker voltage on an alternating current power line subject to sharp load variations, the combination of an electric lamp bulb having a filament connected across said power line so that the light emitted from said filament is proportional to the root-mean-square value of the voltage across said power line, a phototube of the emissive type comprising an anode and a cathode, said cathode being responsive continuously to light emitted from said filament, means for maintaining a direct current potential on the anode of said phototube, a direct current vacuum tube amplifier comprising an amplifying tube and two power tubes, a grid circuit for the control grid of said amplifying tube, grid bias means for normally transmitting a negative bias over said grid circuit to the control grid of said amplifying tube, a grid resistor in said grid circuit, a phototube circuit connected with said grid circuit for causing phototube current to flow through said grid resistor in such direction as to produce a voltage drop across said grid resistor which is in opposition to the voltage of said grid bias means, so that the voltage acting on the control grid of said amplifying tube is the difference between the grid bias voltage and the voltage due to the phototube current flowing through said grid resistor, whereby a decrease in voltage on said power line results in the grid of said amplifying tube becoming more negative, thereby decreasing the plate current in its plate circuit, a plate circuit resistor in the plate circuit of said amplifying tube, a power tube grid circuit connected to the control grids of said two power tubes in parallel, said latter grid circuit being connected to the plate circuit of said amplifying tube in such relation to said plate circuit resistor as to cause the control grids of said two power tubes to be biased less negatively with decrease of plate current flow through said amplifying tube, whereby the plate current flow through the plate circuits of said power tubes is increased with a decrease in line voltage, an electro-magnetic oscillograph comprising a galvanometer coil connected with the plate circuits of said two power tubes in parallel, a mirror actuated by said galvanometer coil, means for projecting a light beam on said mirror, and a photographic film receiving the reflected light beam from said mirror for making a record of the flicker voltage in the form of an oscillograph trace of relatively narrow width and relatively wide swing.

4. In apparatus for measuring the flicker voltage on an alternating current power line subject to sharp load variations, the combination of an electric lamp bulb having a filament adapted to be connected across said power line so that the light emitted from the filament is proportional to the root-mean-square value of the voltage across said line, a phototube responsive continuously to light emitted from said filament, a first electron tube comprising a cathode, a control grid and a plate, a grid circuit for the control grid of said first tube, grid bias means for normally supplying a negative bias over said grid circuit to said control grid, a grid resistor in said grid circuit, a phototube circuit connected from said phototube to said grid circuit for causing phototube current to flow through said grid resistor in such direction as to produce a voltage drop across said resistor which is in opposition to the voltage applied to said control grid by said grid bias means, so that the voltage acting on the control grid of said first tube is the difference between the grid bias voltage and the phototube voltage, a plate circuit resistor in the plate circuit of said first tube, a second electron tube comprising a cathode, a control grid and a plate, a grid circuit connected to the control grid of said second tube, said latter grid circuit being connected to the plate circuit of said first tube in such relation to said plate circuit resistor as to cause the control grid of said second tube to be biased less negatively with decrease of plate current flow through said first tube, an electro-magnetic oscillograph comprising a galvanometer coil connected with the plate circuit of said second tube, a mirror actuated by said galvanometer coil, means for projecting a light beam on said mirror, and a photographic film receiving the reflected light beam from said mirror for making a record of the flicker voltage in the form of an oscillograph trace of relatively narrow width and relatively wide swing.

5. In apparatus for measuring the flicker voltage on an alternating current power line subject to sharp load variations, the combination of an electric lamp bulb having a filament adapted for connection across said power line so that the light emitted from the filament is proportional to the root-mean-square value of the voltage cross said line, a phototube responsive to the light emitted from said filament, an electron tube comprising a cathode, a control grid and a plate, a grid circuit for said control grid, a grid resistor in said circuit, grid bias means for normally impressing a negative voltage on said control grid over said grid circuit, a phototube circuit connecting said phototube with said grid circuit so as to cause phototube current to flow in such direction through said grid circuit that the voltage acting on said control grid is the difference between the grid bias voltage and the phototube voltage, an electromagnetic oscillograph comprising a galvanometer coil connected to be responsive to the plate circut of said electron tube, a mirror actuated by said galvanometer coil, means for projecting a light beam on said mirror, and a photographic film receiving the reflected light beam from said mirror for making a record of the flicker voltage in the form of an oscillograph trace of relatively narrow width and relatively wide swing.

6. In apparatus for measuring the flicker voltage on an alternating current power line subject to sharp load variations, the combination of an electric lamp bulb having a filament adapted to be connected across said power line so that the light emitted from the filament is proportional to the root-mean-square value of the voltage across said line, a phototube responsive continuously to light emitted from said filament, a first electron tube comprising a cathode, a control grid and a plate, a grid circuit for the control grid of said first tube, grid bias means for normally supplying a negative bias over said grid circuit to said control grid, switch means for varying the negative bias transmitted over said grid circuit, a grid resistor in said grid circuit, a phototube circuit connected from said phototube to said grid circuit for causing phototube current to flow through said grid resistor in such direction as to produce a voltage drop across said resistor which is in opposition to the voltage applied to said control grid by said grid bias means, so that the voltage acting on the control grid of said first tube is the difference between the grid bias voltage and the voltage due to the phototube current flowing through said grid resistor, condenser means connected between the cathode of said phototube and said first electron tube for partially filtering out the 120 cycle component in the light output of said lamp bulb, a plate circuit resistor in the plate circuit of said first electron tube, a second electron tube comprising a cathode, a control grid and a plate, a grid circuit connected to the control grid of said second tube, said latter grid circuit being connected to the plate circuit of said first tube in such relation to said plate circuit resistor as to cause the control grid of said second tube to be biased less negatively with decrease of plate current flow through said first tube, an electro-magnetic oscillograph comprising a galvanometer coil connected with the plate circuit of said second tube, a mirror actuated by said galvanometer coil, means for projecting a light beam on said mirror, and a photographic film receiving the reflected light beam from said mirror for making a record of the flicker voltage in the form of an oscillograph trace of relatively narrow width and relatively wide swing.

7. In apparatus for measuring flicker voltage on an alternating current power line, the combination of light generating means adapted to be connected to said power line so as to be responsive to voltage changes on said line and so as emit light rays proportional to the root-mean-square value of the voltage on said line, light sensitive means responsive to said light rays for producing a variable electrical quantity which varies substantially proportionately to the root-mean-square value of the voltage on said line, means for producing a substantially constant electrical quantity, means for bringing said variable electrical quantity and said substantially constant electrical quantity into comparative relationship to determine differences therebetween, and means for measuring these difference as measurements of flicker voltage.

8. In apparatus for measuring flicker voltage on an alternating current load line, the combination of a filament type of lamp adapted to be connected in shunt across said load line so as to emit light rays proportional to the root-mean-square value of the voltage across said line, a phototube responsive to said light rays for producing a unidirectional variable voltage which varies substantially proportionately to the root-mean-square value of the voltage across said line, means for producing a unidirectional constant voltage which is adjusted to bear a proportionate relationship to the normal voltage on said alternating current load line, means for bringing said variable voltage and said constant voltage into a differentiating relationship to determine differences therebetween, means for amplifying said differences, and a recording oscillograph responsive to said amplified differences for making a record of the flicker voltage.

VICTOR H. KRAYBILL.

REFERENCES CITED

The following references are of record in the file of this patent:

UNITED STATES PATENTS

| Number | Name | Date |
| --- | --- | --- |
| 2,038,277 | Gent | Apr. 21, 1936 |
| 2,065,421 | Bernarde | Dec. 22, 1936 |
| 2,113,928 | Behr | Apr. 12, 1938 |
| 2,155,280 | Mikina et al. | Apr. 18, 1939 |
| 2,321,341 | Weatherby | June 8, 1943 |

FOREIGN PATENTS

| Number | Country | Date |
| --- | --- | --- |
| 329,304 | Germany | Nov. 25, 1920 |
| 819,358 | France | Oct. 15, 1937 |